UNITED STATES PATENT OFFICE.

B. C. SMITH, OF BURLINGTON, NEW JERSEY.

IMPROVEMENT IN MAKING CANE-HEMP FOR MAKING PAPER, &c.

Specification forming part of Letters Patent No. 3,349, dated November 21, 1843.

*To all whom it may concern:*

Be it known that I, BARZILLAI C. SMITH, of the city and county of Burlington, and State of New Jersey, have invented a new and useful Method of Manufacturing what I call "Cane-Hemp," which may be used for making cordage, bagging, paper, and many other purposes, of which the following is a description.

First method: I take the cane-plant, indigenous to most of the southern and southwestern of the United States, (commonly known in the other States as the "angling-cane" or "cane-pole,") and known in botany as the *Mugia macrosperma*, of Pursh; *Arundinared macrosperma*, of Michaux; *Arundo gigantia* and *Tecta*, of Walter, either in the green or dry state; but I prefer that it should be green. The first thing to be effected is to reduce the cane from its natural rigid state into a pliant condition, in which the fibers may be separated easily by any of the known processes used for that purpose. To so reduce it I place the cane in a vessel or chamber (made of or lined with lead or any substance that will resist the action of the gas to be used upon it) and pass through the cane a current of hydrofluoric-acid gas, which is obtained by decomposing fluor-spar (fluoride of calcium) by means of sulphuric acid. The fluor-spar is to be powdered and placed in an alembic or retort, (made of lead or any other useful material,) resting in a sand-bath. Sulphuric acid is then to be poured on the spar, the best proportions, I think, being two pounds of the acid to one pound of the spar, the acid and spar to be made into a stiff paste by stirring it a few minutes, the connection being made tight between the alembic or retort and the vessel or chamber where the cane is, and the said bath heated sufficiently. (If lead is used, care must be taken not to raise the degree of heat high enough to melt the lead.) The hydrofluoric-acid gas will pass over into the vessel or chamber containing the cane, and the silex will be taken up as a gas in the form of hydrofluo-silicic-acid gas and will pass out of the discharge-pipe as a white smoke; or, if the discharge-pipe be immersed in water, the gas will be decomposed and hydrate of silica will be deposited in the water in a gelatinous state. Steam or any other proper mode may be adopted as a substitute for the sand bath in heating the alembic or retort. The cane being then removed, I think it best to steep it for one or two hours in a weak solution of chloride of soda or carbonate of soda or potash, hot or cold—if cold is used, requiring more time. Any alkaline lye will answer; but the above-mentioned I think the best, and then the cane should be washed in water. After the cane has undergone the above-described process it will be found that the fiber can be easily separated.

The second process by which the rigidity of the cane may be reduced to the state required is by boiling it in lime-water or cream of lime, (made in the ordinary way,) a good proportion of water for the purpose being thirty-five gallons to a bushel of lime, adding to the lime-water or cream of lime, as above, about two pounds of potash or soda, and then by placing the cane in a suitable kettle or boiler, covering it with the lime-water or cream of lime, which is to be made to boil. The cane will be reduced to the state required in about six or eight hours with a mixture of that strength. As it is to be continued boiling during the process, if the vessels used are open, it will require to be filled up occasionally, as the liquor boils away. The above proportions may be varied and produce the desired effect; but I think the above-named as good as any upon the score of cheapness and efficiency.

The third process is by boiling or steaming the cane in water or steam at a temperature of 250°, or upward, of Fahrenheit's thermometer, generated in a boiler similar in construction to that of the ordinary high-pressure steam-boiler, or any other suitable shape or construction, the cane to be placed in the boiler or steam-chamber, as may be, and subjected to the action of the water or steam heated to the degree indicated—say 250°, or upward—by which the rigidity of the cane will be reduced to the desired state of having its fibers easy to be separated by the ordinary process now used for that purpose. If the cane is green, it will require from fifteen to twenty hours to effect the change at a temperature of 250°; if above that, less time in proportion to additional heat.

When the cane has been brought to a state so that the fiber will readily separate, it should be passed through rollers fit for the purpose, which may be constructed like those now known and used for grinding or rolling sugar-cane; or they may be constructed of any other material, form, or proportion fit for the purpose of displacing and separating the fiber of the cane. This may also be done by beating, pounding, &c.

What I claim as my invention, art, or discovery, and for which I desire to procure Letters Patent, is—

The methods of making what I call "cane-hemp" by the three first above-described processes—viz., the one by fluoric-acid gas; also, the one by lime-water or cream of lime and potash or soda solution, and that by high pressure of water or steam.

BARZILLAI C. SMITH.

Witnesses:
J. J. GREENOUGH,
CHS. M. KELLER.